United States Patent [19]

Neil

[11] Patent Number: 5,142,580

[45] Date of Patent: Aug. 25, 1992

[54] VOICE BAND REDUCTION APPARATUS AND METHOD FOR INCREASING AVAILABILITY OF VOICE CHANNELS

[76] Inventor: J. Philip Neil, 2336 Hilo Ct., Mountain View, Calif. 94040

[21] Appl. No.: 680,035

[22] Filed: Mar. 28, 1991

Related U.S. Application Data

[63] Continuation of Ser. No. 325,239, Mar. 16, 1989, abandoned.

[51] Int. Cl.⁵ .............................. G10L 3/02; H03F 1/42
[52] U.S. Cl. ........................................ 381/29; 333/17.1
[58] Field of Search .................................. 381/29–47; 333/17.1, 17.2, 176, 178; 364/513.5

[56] References Cited

U.S. PATENT DOCUMENTS

| | | | |
|---|---|---|---|
| 2,903,515 | 9/1959 | Smith | 381/41 |
| 3,084,327 | 4/1963 | Cutler | 325/45 |
| 3,297,882 | 1/1967 | Broadhead | 307/88.5 |
| 3,524,081 | 8/1970 | Campanella | 307/317 |
| 3,760,196 | 9/1973 | Nomoto et al. | 307/237 |
| 4,166,924 | 9/1979 | Berkley et al. | 179/1 P |
| 4,255,620 | 3/1981 | Harris et al. | 179/15.55 P |
| 4,383,229 | 5/1983 | Jones | 333/176 |

OTHER PUBLICATIONS

Horowitz et al., The Art of Electronics. Cambridge University Press, p. 42, 1980.

Primary Examiner—Dale M. Shaw
Assistant Examiner—Michelle Doerrler
Attorney, Agent, or Firm—Herbert L. Lerner; Laurence A. Greenberg

[57] ABSTRACT

An apparatus for frequency band reduction of a voice signal having an upper and lower band limit including a voice signal input, a clipping circuit for clipping the positive and negative peaks of the voice signal connected to the voice signal input. A bandpass filter is connected to the clipping circuit for rejecting harmonics created by the clipping circuit. A low and high end roll off filter device is provided for producing a given decibel/octave frequency roll off at the lower band limit; and the geometric mean value of the upper and lower band limit falls within a given lower and a given upper frequency range.

8 Claims, 4 Drawing Sheets

VOICE BAND REDUCTION APPARATUS AND METHOD FOR INCREASING AVAILABILITY OF VOICE CHANNELS

This application is a continuation of application Ser. No. 325,239, filed Mar. 16, 1989, now abandoned.

The invention relates to an aparatus and a method for frequency band reduction of a voice signal, and more particularly to frequency band reduction by means of clipping the peaks of a voice signal and rejecting the harmonics created by the clipping, by means of a bandpass filter having special characteristics according to the invention. As a result the average voice energy level is increased, leading to better noise reduction and savings in frequency band use.

BACKGROUND AND PRIOR ART

U.S. Pat. No. 4,383,229 shows clipping only of specific harmonics, which is different from the method disclosed herein.

Using clipping of the peaks of a voice signal followed by filtering in a bandpass filter has long been known. U.S. Pat. No. 3,297,882 shows such an arrangement. The latter patent shows only clipping and pass band filtering. Clipping and band-filtering alone however has never gained widespread use as means for band reduction due to the fact that clipping and band filtering according to the known art has resulted in poor voice signal quality and loss of speaker recognition.

Voice band reduction clearly is a much desired object, since it makes possible an increased number of voice channels within a frequency band of a given width. This is especially true in radio communication, including satellite communication, and carrier-based land lines wherein the available bandwidth is constrained by the availability of usable frequency bands.

Clipping of a voiceband signal according to the instant invention leads to increased voice energy levels especially above 1000 Hz where normal speech energy levels tend to roll off.

Unlike the prior art, in the instant invention clipping is applied on a broad band basis and the harmonics created in the clipping process are eliminated by means of suitable filtering as disclosed in more detail in the following disclosure.

It is therefore a primary object of the instant invention to provide apparatus and a method of frequency band reduction of a voice signal having a given original bandwidth without significant loss of voice signal quality and speaker recognition.

SUMMARY OF THE INVENTION

The apparatus for voice band reduction includes a voice signal clipping circuit that clips the positive and negative 2 peaks of the voice signal, followed by a bandpass filter having upper and lower band limits such that the square root of the product of the band limits falls within a range of 650 and 900 Hertz and both the low and high end of the band has a roll off of 6 decibel/octave. In other words the geometric mean value of the band limit frequencies is within the range of 650-900 Hertz. The stated range has the dimension of Hz, but is not equal to the signal bandwidth, which also has the dimension of Hertz.

The band pass filter serves to remove the harmonics created by the clipping process, which would otherwise lead to severe distortion of the voice signal.

A low and high end roll off at a rate of 6 decibel/octave is necessary in order to maintain an acceptable voice signal quality. Without the roll-off, the clipping and bandpass filtering causes the signal to sound "boomey" and "hollow" to an unpleasant degree and causes loss of speaker recognition. The low and high end roll is necessary to obtain the desired frequency band reduction.

The clipping of the peaks of the voice signal causes an evening-out of the variations in the signal energy of the voice signal. The human voice is naturally modulated such that the root-mean-square value of the voice energy constantly fluctuates within a wide range during conversation, resulting in a relatively low average energy level. The peak energy level of most transmission apparatus is limited to a given upper value. The clipping and filtering of the voice signal therefore operates to increase the average voice signal level which is beneficial in overcoming noise and improving speech comprehension.

The use of a geometric mean value of the signal band in the range of 650-900 Hertz is lower than that of conventional non-reduced telephony voice channels, which usually have a band-width of typically 300-3000 Hertz, giving a geometric mean value of 949 Hertz. In reducing the signal bandwidth by clipping and filtering, the applicant has found that it is important to move the geometric mean value of the band limits downward by controlling both the upper and lower band limit. In this way a voice band of for example 300 to 2000 Hz has been found to be attainable without significant loss of voice quality and speaker recognition. Such a band-limited signal has a bandwidth of 1700 Hertz, which is a significant band reduction compared with the conventional band width of 2700 Hertz, resulting in 1.6 times more usable voice channels within a given frequency band. It has been found that the voice passband can be reduced to as low as 1 Hertz while still retaining useable syllabic, word and sentence articulation in addition to some degree of speaker recognition.

In accordance with the inventive concept the bandpass filter and the filter means for creating the 6 decibel/octave roll-off can be realized by means of active or passive filters or a combination thereof, or by means of a single filter or several cooperating filters.

The clipper circuit can advantageously be realized by means of two anti-parallel silicon diodes connected at one end to the input of the band pass filter and at the other end to ac-ground, or by means of two clipping diodes, having their respective anode and cathode joined and connected to the input of the band pass filter and their respective cathode and anode connected to a positive and negative clipping potential of equal magnitude for the purpose of symmetrical clipping.

In accordance with a further feature, the band-reducing apparatus according to the invention is well suited to be combined with the transmitting apparatus of land-based carrier systems for adding further voice bands. The band-reducing apparatus is especially well suited to be incorporated into radio transmitters for maritime and airborne radio communications systems.

When used in radio communication the invention has the further significant economic advantage that the invention can be implemented by adaptation of only the transmitting apparatus while no decoding or signal processing is required in the receiving apparatus.

In a further improved arrangement of the invention a controlled degree of rolloff is applied at both ends of the voice band to preserve the optimum degree of voice quality and speaker recognition. The rolloff is determined by a logarithmically-derived formula for a given voice frequency passband.

In accordance with still another feature of the invention a bypass switch is provided which selectively operates to bypass the clipping and bandlimiting apparatus which can be used under special circumstances if required for voice channel testing purposes, data transmission or other purposes.

It is to be understood that the instant disclosure with appended drawings and claims are only exemplary of the invention, since the invention is capable of further embodiments and features, as they may fall within the scope of equivalencies of the claims.

DESCRIPTION OF THE PREFERRED EMBODIMENTS

Figure 1:
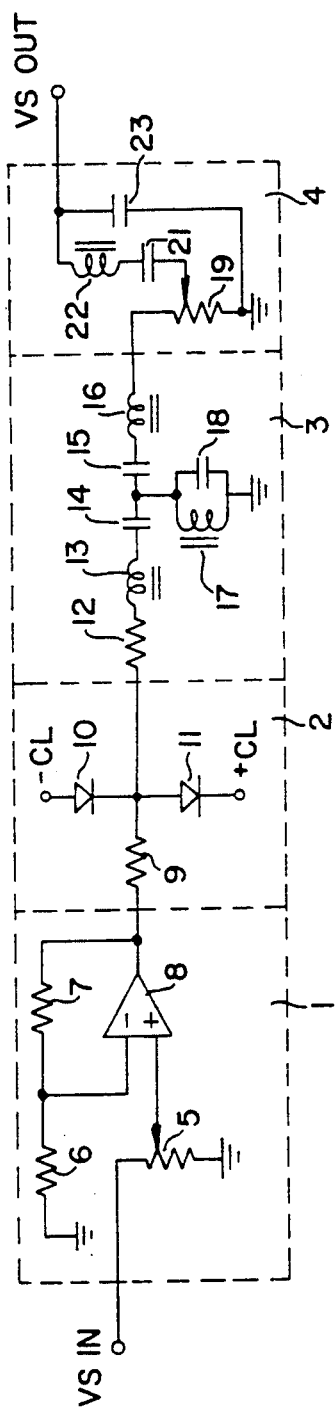
FIG. 1 is a block diagram of the invention, showing the major function blocks, including a preamplifier, a clipping circuit, and bandpass filter.

In FIG. 1 a voice frequency signal is connected to an input VSin of an amplifier stage 1, having an input terminal connected to a potentiometer 5, having an output connected to the noninverting input of an operational amplifier 8. A negative feedback network having resistors 6, 7 provides negative feedback from the output of the amplifier to its inverting input to provide stability. A clipping network 2 has two series-connected diodes 10, 11 respectively having a negative clipping potential −CL connected to the anode of a the first diode 10 and a positive clipping potential =CL connected to the cathode of the second diode 11. The clipping potentials −CL and +CL are of equal magnitude for symmetrical clipping of the voice signal, and are selected such that the clipping potentials clip a given part of the peaks of the voice signal. The clipping signals are typically 60 to 80 percent of the maximum peak amplitudes of the voice signal. The diodes 10, 11 are joined at their respective cathode and anode in a junction point connected via a resistor 9 to the output of the amplifier 8. The resistor 9 provides a degree of isolation between the amplifier 8 and the clipping circuit 2 for sharper clipping. The clipped voice signal of the junction point is connected to the input of a bandpass filter 3 consisting of two series sections formed of capacitors 14, 15 and inductors 13, 16; and a shunt section formed of a parallel circuit of inductor 17 and capacitor 18. A filter input series resistor 12 may optionally be provided to isolate the clipping circuit 2 from the filter 3 and to provide improved impedance matching for the filter 3.

The output of the bandpass filter 3 is connected to a roll-off network consisting of an input potentiometer 19, a series LC branch, consisting of capacitor 21 and inductor 22 in series with the sliding contact of the potentiometer 19, and a shunt capacitor 23 connected between the output of the inductor 22 and ground potential. The band-reduced voice signal appears at output terminal VSout, connected to the junction of the inductor 22 and capacitor 23.

The values of the components of the roll-off network are selected such that capacitor 21 and inductor 22 have a broad maximum around the center frequency of the voice signal measured as the geometric mean of the upper and lower band limit, with roll-off to both sides of that frequency. The potentiometer 19 determines the degree of roll-off and is typically set such that the roll-off is approximately 6 decibel/octave, due to the damping effect of the potentiometer 19.

Figure 2:
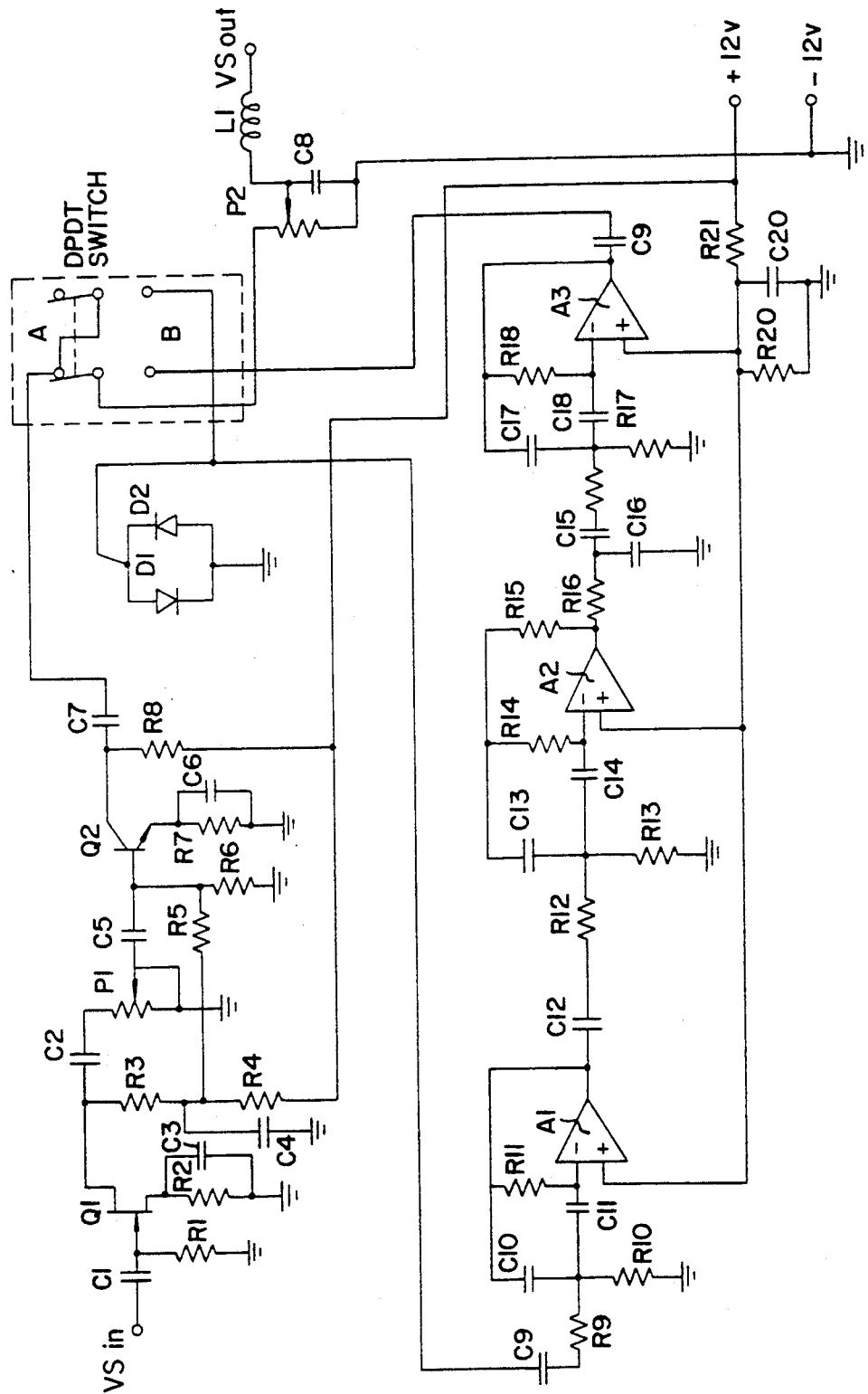
FIG. 2 is a schematic circuit diagram of a band-reduction apparatus showing details of the circuit.

FIG. 2 is a more detailed circuit diagram of a bandreducing circuit according to the instant invention. It is built of all solid-state components and active filters. The voice frequency signal enters the circuit at imput terminal VSin and is connected via input capacitor C1 to the gate of a unijunction transistor Q1, the output of which is connected via coupling capacitor C2 to a signal level control protentiometer P1, the output of which is connected via coupling capacitor C5 to the base of transistor Q2, which provides a second gain stage. The collector of transistor Q2 is connected via coupling capacitor C7 to a double pole double throw switch DPDT having an upper position A and a lower position B. In position B the coupling capacitor C7 is connected via switch DPDT to one side of a clipping circuit consisting of two antiparallel diodes D1,D2, having their other side connected to ground potential. The clipping diodes are advantageously of the silicon type, which have greater forward voltage drop and therefore, in this application require no clipping potentials.

In position A switch the double pole, double throw switch connects the voice frequency signal from capacitor C7 directly via an output circuit consisting of potentiometer P2, capacitor C8 and inductor L to the output terminal VSout, bypassing the clipping circuit D1,D2. In position B of switch DPDT the clopping circuit D1,D2 is connected into the voice signal path from transistor Q2, which continues from the clipping circuit to the input of a three stage active bandpass filter consisting of stages A1,A2 and A3. The three stage active bandpass filter advantageously has a passband of 300 to 2000 Hert, giving a geometric mean frequency equal to the square root of 300 times 2000, which equals 775 Hertz, with a passband of 1700 Hertz. The components of the active filter are selected such that a roll off of 6 decibel/octave is attained in connection with the output network L1,C8, measured from the band limits 300 and 2000 Hertz.

The double pole, double throw switch DPDT serves to bypass the clipping circuit and bandpass filter in situations wherein best results may be obtained without the band-reduction circuit, for example in data transmission or during transmission level measurements, or in situations wherein a broadband signal must be transmitted.

Figure 3:
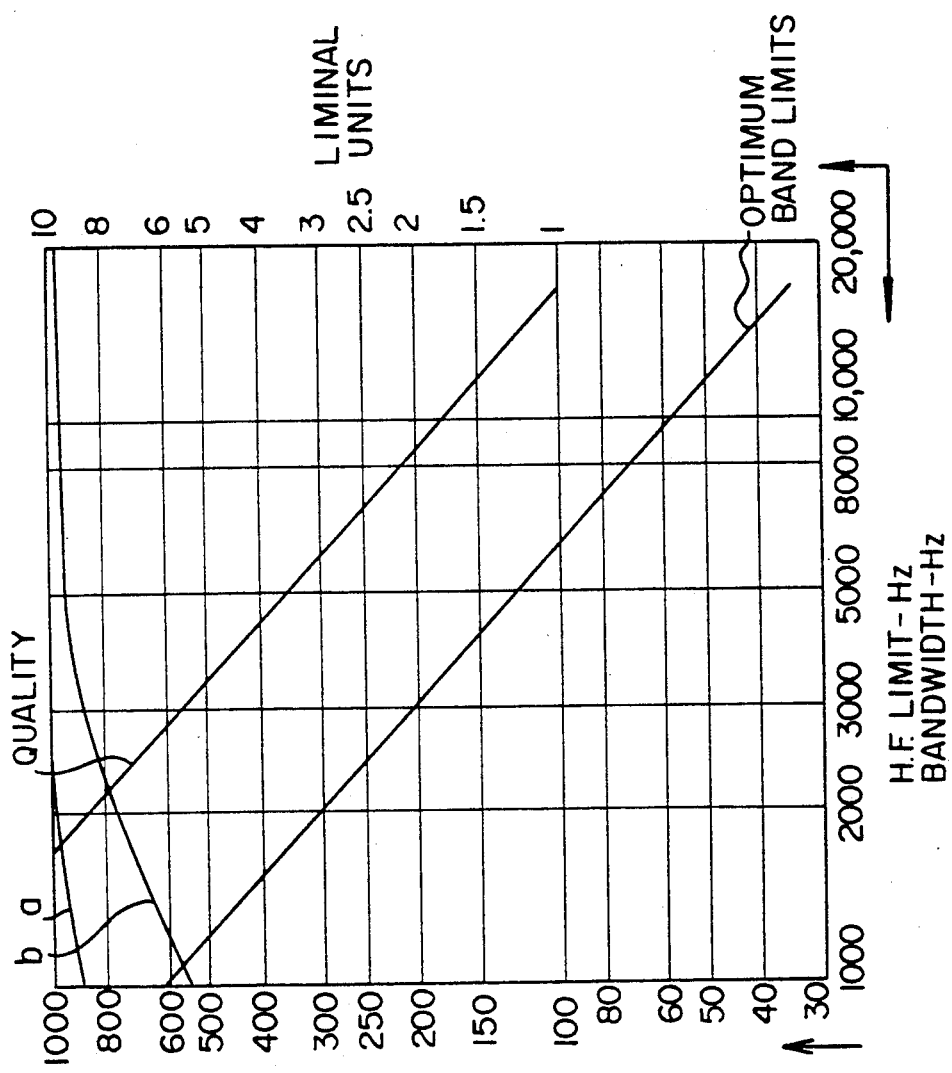
FIG. 3 is a graph showing band limits for various degrees of voice quality.

FIG. 3 is a graph in logarithmic scale wherein the ordinate axis represents the lower limits of a family of voice bands and the abcissa represent the corresponding upper band limits. The line labelled "optimum bandwidth" shows the relationships of the corresponding upper and lower bandwidth for voice frequency bands of optimal quality with the indicated band limts. The quality is evaluated in regard to voice articulation parameters (curve a) that include syllabic (curve b), word and sentence recognition as well as speaker recognition. for example the voice band from 300 to 2000 Hertz mentioned above can be determined from the above-mentioned line "optimum bandwidth".

The right hand ordinate is graded in "liminal units" which is an approximate measure of the quality of articulation of a band-reduced voice signal. One liminal unit is a rough measure of the just discernable increment in voice articulation.

The upper line labelled "quality" indicates band limits for a voice signal of relatively high grade, still with band limits giving the highest degree of articulation for a given bandwidth.

Figure 4:
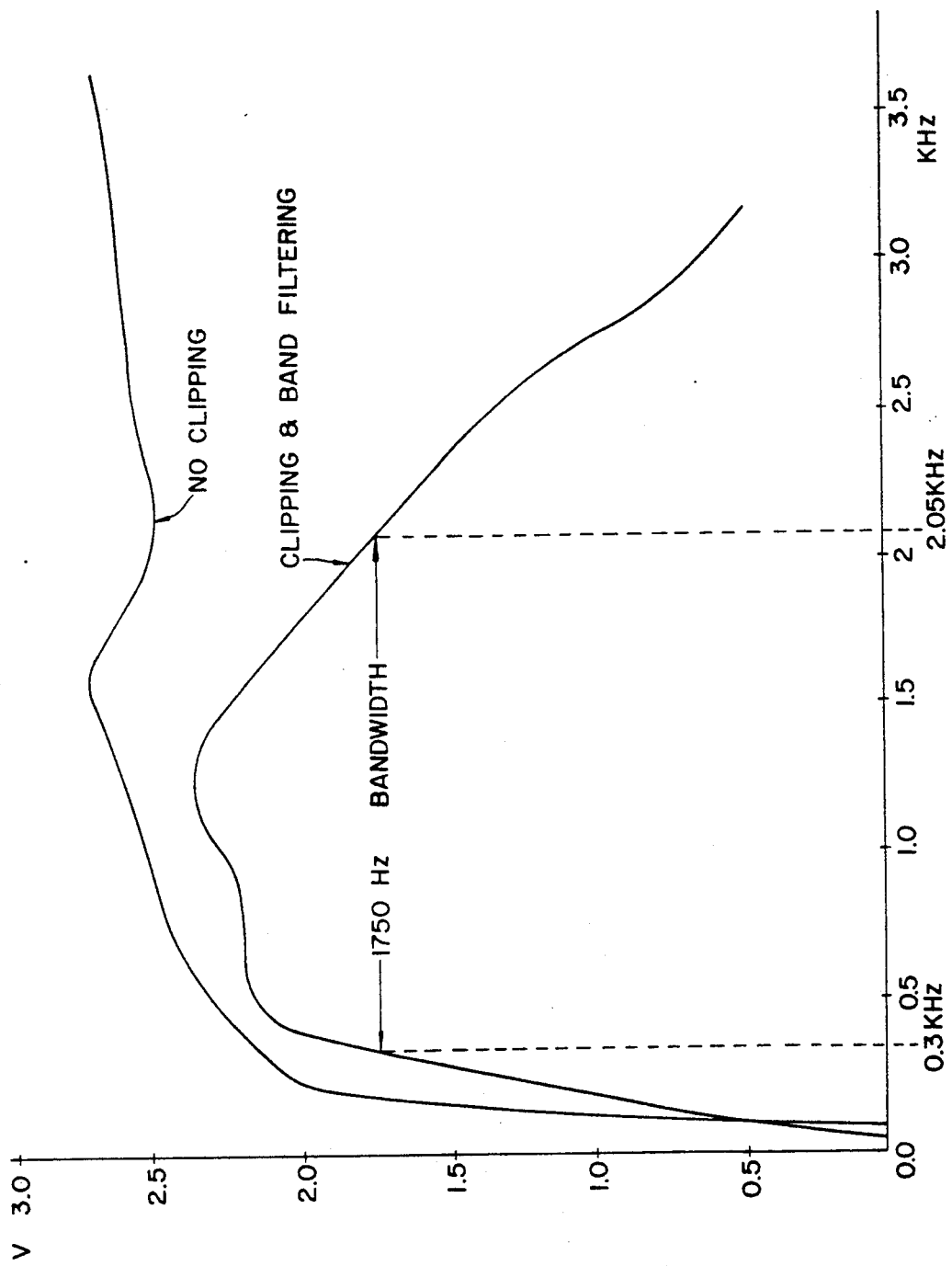
FIG. 4 is a graph showing bandlimits for a typical band-reduced voice signal.

FIG. 4 shows graphs of an unclipped voice signal (upper curve) and a clipped and band-filtered signal according to the circuit shown the FIG. 2 (lower curve). It has a band-width of 300 to 2050 Hertz and has been judged by a poll of listeners to provide a good degree of voice articulation combined with satisfactory speaker recognition.

I claim:

1. Apparatus for frequency band reduction of a voice signal having an upper and lower band limit, comprising a voice signal input, a band-reduced voice signal output, a limiter circuit for limiting the positive and negative peaks of a voice signal connected to the voice signal input; a bandpass filter having a passband within 950 to 1200 Hertz connected to the limiter circuit for rejecting harmonics created by the limiter circuit, the limiter circuit having two antiparallel silicon diodes connected at one end to an input of said bandpass filter and at the other end to ground potential; low end frequency roll of filter means in said bandpass filter for producing a given decibel/octave frequency roll off at the lower band limit; high end frequency roll off filter means connected between an output of said bandpass filter and said band-reduced voice signal output; and wherein the geometric mean value of the upper and lower band limit of said bandpass filter falls within a given lower and a given upper frequency range 950 to 1200 Hertz.

2. Apparatus according to claim 1 wherein said bandpass filter is a passive filter of the third order.

3. Apparatus according to claim 1 wherein said bandpass filter is an active filter of the third order.

4. Apparatus according to claim 3 wherein said limiter circuit includes first and second dipping diodes joined at their respective cathode and anode in a junction point connected to an input of said active filter, and conected with their respective anode and cathode to a ground potential for clipping the peaks of the voice signal.

5. Apparatus according to claim 1 wherein said high end frequency roll off filter means include a passive inductance-capacitance-filter of the second order.

6. Apparatus according to claim 1 wherein said high end frequency roll off filter means include an active filter of the second order.

7. Apparatus according to claim 1 including switch means connected between said limiter circuit and said output of said bandpass filter for selectively bypassing said limiter circuit and bandpass filter.

8. Method for voice band frequency reduction, comprising the steps of: limiting symmetrically the peaks of a voice band signal by means of two anti-parallel diodes connected between ground potential and the voice band signals, said voice band signal carried in a single circuit branch; frequency band-limiting the voice band signal in a bandpass filter having a given passband having upper and lower band limits, and next selecting said band limits of said bandpass filter such that the square root of the product of the band limits falls within a given range.

* * * * *